April 29, 1947.   R. P. CASSELL   2,419,763
METHOD OF MOLDING GLASS ARTICLES
Filed Dec. 17, 1943   2 Sheets-Sheet 1
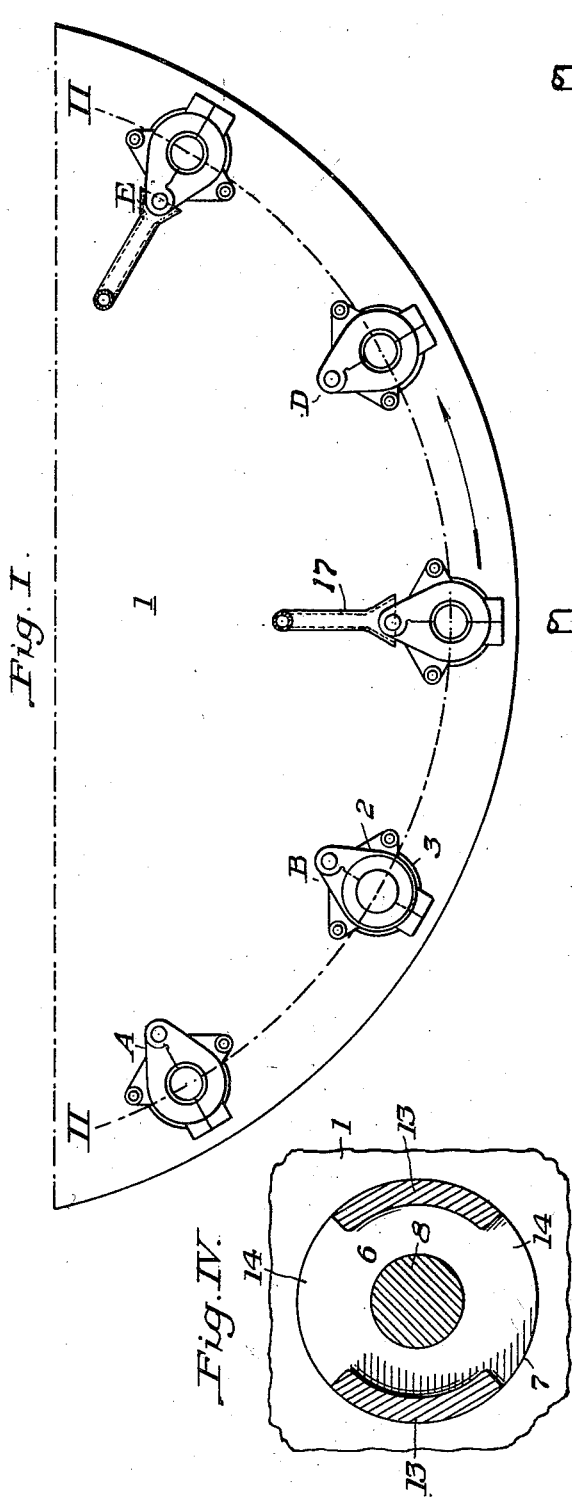
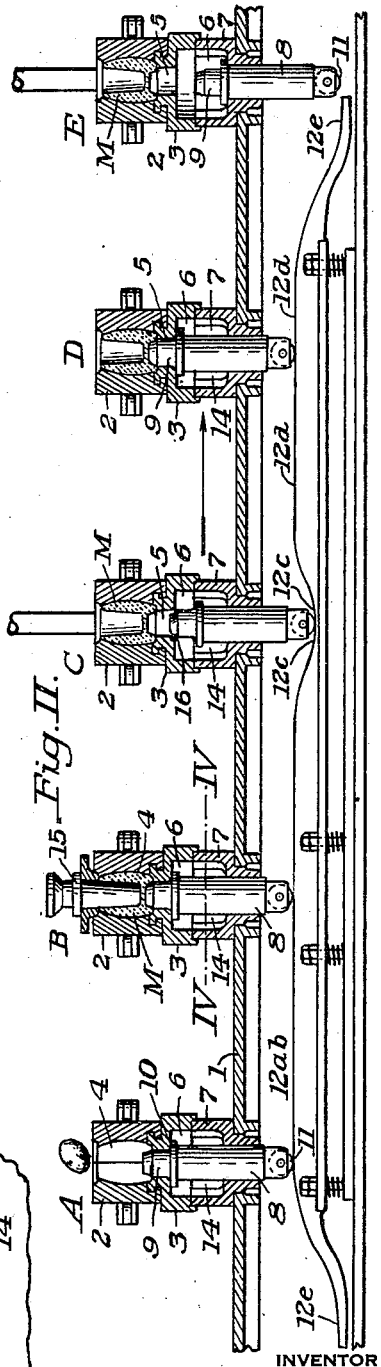
INVENTOR
Robert P. Cassell
by William B. Wharton
his attorney

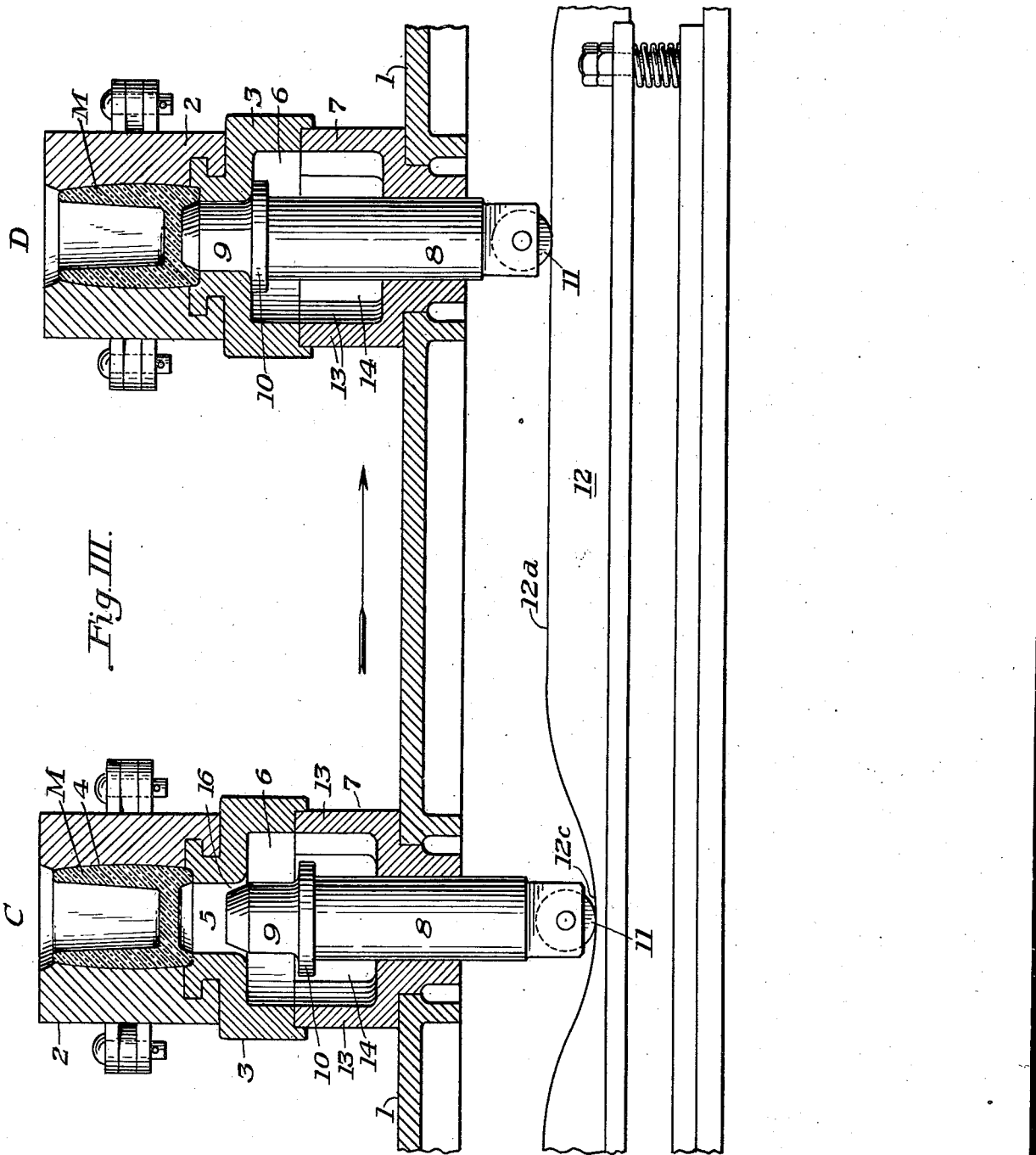

Patented Apr. 29, 1947

2,419,763

UNITED STATES PATENT OFFICE 2,419,763

METHOD OF MOLDING GLASS ARTICLES

Robert P. Cassell, Jeannette, Pa., assignor to The Jeannette Glass Company, Jeannette, Pa., a corporation of Pennsylvania Application December 17, 1943, Serial No. 514,692

3 Claims. (Cl. 49—85)

This invention relates to the automatic molding of glass articles.

In the automatic production of glass articles having a cavity and a formed bottom, it is the practice to use two-piece molds, the upper portions of which are split, and to support the bottom of the molded body by means of a vertically movable bottom plunger. This plunger determines the bottom contour of the vessel or like article, while an upper plunger vertically movable into the mold occupies the space which is to be the cavity of the vessel, or like article which is formed. If, however, the vessel or other article is to have a relatively heavy bottom, such as the false bottom of a glass drinking mug, the molten glass of which it is formed has a substantial quantity of heat which is dissipated slowly in the confinement of the mold. This creates the problem that such retained heat tends so to heat the bottom plunger that the glass in that region of the mold sticks to it. Whereas the upper plunger may be withdrawn as soon as the article is formed, exposing the walls surrounding the cavity of the article to the cooling effect of the atmosphere, the bottom plunger should remain in position to support the still viscous body of glass in the bottom of the mold, and hold it in shape. These requirements present such inconsistency that the automatic molding of heavy-bottom vessels previously has been considered impossible.

The object of my invention is to provide an automatic method of molding glass vessels and like articles, having bottoms which comprise such relatively great weight of glass as to have a high heat content while the glass is molten, in such manner that the articles are kept in shape until they cool, without permitting them to stick to the structure which forms and supports them.

This object I accomplish by incorporating in the molding operation intermediate steps by which the molding structure supporting the bottom region of the article is cooled and which desirably also hasten solidification of the body of glass in that region of the article, while preserving the shape of the article against the flowing tendency of the glass.

The accompanying drawings illustrate exemplary apparatus for performing the method of my invention.

In the drawings:

Fig. I is a fragmentary plan view of the mold-carrying table of a rotary glass-forming machine of the sort which is indexed step by step between working stations, this figure of the drawings showing five split molds corresponding to the molds of the five stations illustrated in Fig. II of the drawings.

Fig. II of the drawings is a sectional straight line development of fragmentary structure forming part of a rotary glass-forming machine, showing five stations of the machine in which molding operations in accordance with the method of my invention are performed and taken on the line II—II of Fig. I.

Fig. III is a view showing two working stations corresponding to two of the stations shown in Fig. II of the drawings, illustrating the performance of steps in the method of my invention.

Fig. IV is a cross-sectional view through the base structure of one of the glass-forming molds taken in the plane of the section line IV—IV of Fig. II, and showing the base structure of the mold on an enlarged scale.

Considered apart from any specific apparatus structure, such as the structure illustrated herein, which may be used for its performance, the method of my invention consists in introducing a charge of glass into an open bottom mold closed for initial formation of such body by a movable bottom closure; then pressing the molten body of glass into the desired form of the article against the sides of the mold and the movable bottom closure by insertion of a top plunger into the mold; then withdrawing the bottom closure for a short interval while subjecting the glass-forming portion of that closure and the bottom region of the formed article in the mold to a cooling medium, such as cooling air; then for an interval restoring the bottom closure to its forming position to support and re-form the bottom of the article, which is still sufficiently viscous for that operation; then withdrawing the bottom closure for final cooling of the formed article in the mold preparatory to its discharge therefrom.

The method of my invention hinges upon two discoveries, both of which are unexpected. One is that the bottom closure may be temporarily removed for cooling and to permit some cooling in the bottom region of the article which has been formed, without causing such flow of the molten glass at the bottom of the formed article as irremediably to destroy its shape. The other is that by restoring the bottom closure to forming position, the shape of the molded article may be wholly and accurately restored, the glass of which it is composed being still sufficiently viscous after the partial cooling operation to admit of that effect. By this method, a glass article comprising a relatively great body of molten glass in its bottom region may be truly and accurately formed without permitting the glass to stick to the bottom closure.

Considering now the method in conjunction with the exemplary apparatus shown in the drawings, reference numeral 1 designates a rotary mold-carrying table. On mold-carrying table 1 are a plurality of forming molds having split hinged upper portions 2 and lower portions 3. In closed condition of the molds, there is an upwardly presented opening of the mold cavity 4 by which mold charges are received. As shown most clearly in Fig. III of the drawings, there is also a passage 5 at the lower end of upper mold portion 2 and the upper end of the lower mold portion 3 extending into an air chamber 6 lying partially within lower mold portion 3 and partially within the mold base or mounting structure 7. A bottom closure, or plunger, 8 has a shank movable in a bore at the bottom of mold base 7, a forming head 9 arranged to be moved upwardly into passage 5 at the bottom of the mold, and a shoulder 10 arranged to limit the upward movement of the head. A roller 11 is mounted at the end of the bottom plunger shank and rides on a cam-track 12 organized to cause limited upward and downward movement of the bottom plunger in the mold assembly as the mold-carrying table 1 and the cam-track 12 are moved relatively. In the conventional organization shown as exemplary, it is the mold-carrying table 1 which moves and cam-track 12 is fixed.

The base element 7 of the mold assembly is formed with two incomplete arcuate side walls 13 to provide opposed openings 14 arranged radially of the mold-carrying table. This provides for the direction of a jet of air into and through the mold assembly from air nozzles 17 shown somewhat diagrammatically in Fig. I, which, in conventional arrangement, are mounted independently of the mold-carrying table to project jets of air against and into the molds at selected stations into and out of which each of the molds is moved in indexing movement of the mold-carrying table.

As shown in Fig. I of the drawings, indexing rotation of the mold-carrying table is counterclockwise, the five stations shown being designated sequentially with respect to the progress of the table as A, B, C, D, and E. These same five stations appear in the development of Fig. II, the movement of the table in that figure of the drawings being from left to right.

Station A is the feeding station in the sequence of operations involved in my method. In it, bottom plunger 8 is moved upwardly into position to act as a bottom closure for the mold, with its head projected upwardly into the mold cavity. This upward movement is caused by the plunger riding up from the depressed region 12e of the cam-track on to an elevated level region 12ab of the cam-track.

From feeding station A the same mold, carrying the charge of molten glass, is indexed onwardly to pressing station B, at which station a top plunger 15 descends and forms the glass article (shown as a drinking mug M) against the walls of the mold and the head of the bottom plunger. Top plunger 15 is immediately withdrawn.

After withdrawal of top plunger 15, the mold is indexed forwardly to station C, which station is organized for the performance of a novel step of my method, namely, the partial cooling of the bottom of the molded article and the head of the bottom plunger. In station C, the bottom plunger rides downwardly to the bottom of a depressed region, or dip, 12c of the cam-track. This depression is of a depth to give a downward movement of the plunger sufficient to cause retraction of the plunger head from forming position, and sufficiently far down in the mold assembly to provide a narrow annular channel 16 between air chamber 6 and the passage 5 at the bottom of the mold. A jet of air being directed from a nozzle 17 into the air chamber 6, air passes through the annular channel 16, cooling the head of the plunger, and in some measure cooling the body of glass of which the bottom of the formed article is composed.

In moving to reforming station D, bottom plunger 8 rides up from dip 12c in the cam-track on to elevated region 12d of the cam-track, this region 12d being at the same level as the cam-track region 12ab, in which the feeding and forming operations are performed. Riding on to this second elevated region 12d moves plunger 8 upwardly such distance that in station D its head 9 is restored to bottom-forming and supporting position with respect to the base of the glass article in the mold. In station C, the head of the plunger has been cooled sufficiently to prevent the glass at the bottom of the formed article from sticking to it, and that body of glass, while partially cooled, has not been so chilled as to be incapable of accurate reformation in station D to the shape imposed by the head of the bottom plunger.

As the mold is indexed forward to station E, the bottom plunger rides down the cam-track again into depressed region 12e, in which the plunger is fully retracted to provide free passage of cooling air from a spraying nozzle through the base of the mold into air chamber 6. Cooling of the formed article in the mold is completed in this and succeeding stations in the progress of the mold-carrying table.

It is important in conducting my method that the intermediate cooling step be so performed that the body of glass at the bottom of the article being molded is not given opportunity substantially to flow, and is not chilled beyond a point at which it remains viscous and reformable. Thus, in the exemplary apparatus disclosed herein, the vertically movable plunger which operates as a bottom closure and bottom-forming member is retracted only long enough adequately to cool its glass-contacting surface, and is raised quickly into its cooperative relation with the bottom opening of the mold, quickly to support and to reform the bottom of the molded glass article.

If the method of my invention be used automatically to produce glass articles having particularly heavy bottoms comprising such volume of molten glass that difficulty is encountered in dissipating the heat content of such body, I have found it desirable to repeat the partial cooling step rather than to lengthen its duration. With respect to the apparatus embodiment herein shown as exemplary, this involves the provision of an additional dip and rise in the cam-track beyond the station D to give a second station for partial cooling, and a second station for reformation before the bottom plunger is fully retracted finally to cool the molded article; rather than continuing the initial retraction of the plunger during movement through two or more stations.

The method of the invention is illustrated as performed in a rotary glass-forming machine in which each of the molds is indexed at a circularly-arranged sequence of stations, and a specific form of mold and bottom plunger is shown and described. It is, however, to be understood that the method of my invention may be performed in apparatus of various other types and in molds differing widely from the molds as herein shown and described, it being requisite for the performance of my invention only that the apparatus be such as to present each of the several molds at a plurality of sequential stations; that the molds be open-bottom molds having bottom closures arranged for suitably controlled movement associated with them; and that the organization be such as to supply to the molds, and that the molds be formed to receive cooling air or other suitable cooling medium. As above indicated, the method itself is susceptible of substantial variation in its performance.

The disclosure of apparatus embodiment for performing my method being exemplary and the disclosure of the method steps herein made being in measure exemplary, I do not intend to limit my invention to means utilized in performing the method; nor to the specific performance of the method herein disclosed other than by the definition of the claims appended hereto.

I claim as my invention:

1. In automatically press-molding glass articles having slow-cooling bottom regions by use of an open bottom mold and a bottom-forming closure member movable automatically into and out of cooperative relation with said mold at its bottom; the herein-described method of producing truly formed articles by press-molding the glass with the closure member in its cooperative position, retracting the said closure member and cooling the glass-contacting surface thereof, and while the glass in the bottom region of the article molded is still viscous finally forming the said bottom region by restoring the cooled closure member to cooperative position in the mold in supporting and forming contact with the bottom of the molded article.

2. In automatically press-molding glass articles having slow-cooling bottom regions by use of an open bottom mold and a bottom-forming closure member movable automatically into and out of cooperative relation with said mold at its bottom; the herein-described method of producing truly formed articles by press-molding the glass with the closure member in its cooperative position, retracting the closure member while directing a cooling jet of air against the glass-contacting surface thereof, and while the glass in the bottom region of the article molded is still viscous finally forming the said bottom region by restoring the cooled closure member to cooperative position in the mold in supporting and forming contact with the bottom of the molded article.

3. In automatically press-molding glass articles having slow-cooling bottom regions by use of an open bottom mold and a bottom-forming closure member movable automatically into and out of cooperative relation with said mold at its bottom; the herein-described method of producing truly formed articles by press-molding the glass with the closure member in its cooperative position, retracting the said closure member, cooling the glass-contacting surface of the said closure member and hastening solidification of the glass at the bottom of the molded article by directing a jet of cooling air thereagainst, and while the glass in the bottom region of the article molded is still viscous finally forming the said bottom region by restoring the cooled closure member to cooperative position in the mold in supporting and forming contact with the bottom of the molded article.

ROBERT P. CASSELL.

REFERENCES CITED

The following references are of record in the file of this patent:

UNITED STATES PATENTS

| Number | Name | Date |
| --- | --- | --- |
| 2,350,220 | Ehret, Jr. | May 30, 1944 |
| 1,471,608 | Irwin et al. | Oct. 23, 1923 |
| 858,812 | Johns | July 2, 1907 |
| 994,806 | Wanko | June 13, 1911 |
| 162,791 | Beck | May 4, 1875 |
| 1,680,544 | Ingle | Aug. 14, 1928 |